J. FRANK.
Cultivator.
No. 67,522.
Patented Aug. 6, 1867.
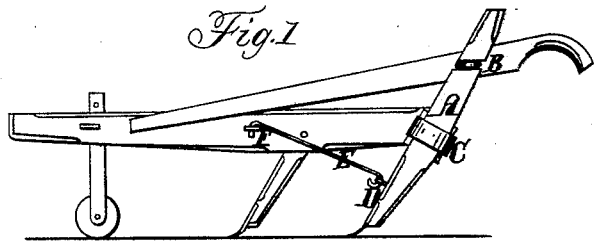
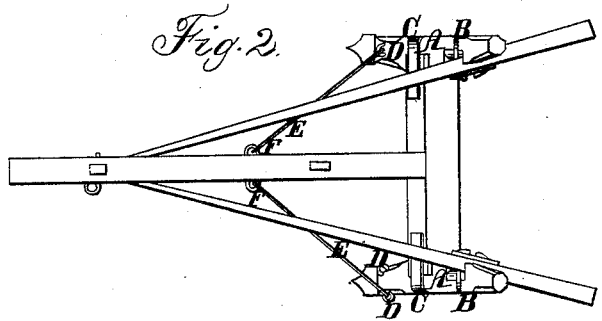

United States Patent Office.

JOHN FRANK, OF WEBSTER CITY, IOWA.

Letters Patent No. 67,522, dated August 6, 1867.

---

IMPROVEMENT IN CULTIVATORS.

---

The Schedule referred to in these Letters Patent and making part of the same.

---

TO ALL WHOM IT MAY CONCERN:

Be it known that I, JOHN FRANK, of Webster City, in the State of Iowa, have invented a new and useful Improvement in Cultivators or Shovel-Ploughs; and I do hereby declare that the following is a full, clear, and exact description of the construction and operation of the same, reference being had to the annexed drawings, making a part of this specification, in which—

Figure 1 is a lateral view, and

Figure 2 a perspective view thereof.

A represents the leg, having, at the junction with the plough-arms, a shoulder cut, bearing on the circumference of a circle, and corresponding in width to that of the handle B. A staple placed round the leg, fitting in the groove cut round the outer sides of the leg, and extending through the arm, holds the leg securely in its place. C, an iron strap fitting the leg, which is made round at this point. The bent of the strap corresponds to the size of the staple B. On the inner side of the leg at this point the shoulder is extended, and corresponds in width to the end of the cross-beam of the plough. The ends of the cross-piece are made concave and fit the circumference of the shoulder. D D' are staples upon the leg, fixed in the centre, and also in the inner and outer edges of the leg facing the team. E, a hook, with open crook at the staple, and fastening in the staples F in the beam of the plough.

The object of the improvement is to afford a cultivator or shovel-plough with the outer legs adjustable by means of the hook in the different staples as to throw the ground in the direction desired by the attendant. By placing the hook in the outer staple the ground will be thrown from the plant, and by placing it in the inner one it will be thrown towards the plant.

What I claim as my improvement, and desire to secure by Letters Patent, is—

A cultivator or shovel-plough having the leg A, staple B, strap C, staples D D', hook E, and staple F, arranged, combined, constructed, and operating substantially as described.

JOHN FRANK.

Witnesses:
WILLIAM W. FUNK,
EDWARD FRANK.